United States Patent [19]
Tate

[11] 3,938,263
[45] Feb. 17, 1976

[54] COMPARTMENTALIZED MICROMAGNET DISPLAY DEVICE

[75] Inventor: Clarence R. Tate, Fairfield, Ill.

[73] Assignee: Thalatta, Inc., Fairfield, Ill.

[22] Filed: Mar. 27, 1970

[21] Appl. No.: 23,424

Related U.S. Application Data

[63] Continuation-in-part of Ser. No. 756,711, Aug. 6, 1968, abandoned, which is a continuation-in-part of Ser. No. 553,086, May 26, 1966, abandoned.

[52] U.S. Cl. .................. 35/66; 40/106.45; 335/303; 346/135; 360/56
[51] Int. Cl.² ......................... B43L 1/12; H01F 3/00
[58] Field of Search ...... 335/302, 303, 306; 29/607; 156/383; 35/61, 66; 346/21, 74 MP; 161/DIG. 5, 18; 117/36.7; 40/106.45; 324/43

[56] References Cited
UNITED STATES PATENTS

| | | | |
|---|---|---|---|
| 3,043,685 | 7/1962 | Rosenthal | 346/74 MP UX |
| 3,221,315 | 11/1965 | Brown | 346/74 MP X |
| 3,320,523 | 5/1967 | Trimble | 346/74 MP X |
| R25,822 | 7/1965 | Tate | 35/66 |

*Primary Examiner*—Harland S. Skogouist
*Attorney, Agent, or Firm*—Sidney B. Ring; Hyman F. Glass

[57] ABSTRACT

A device adapted to provide a visual display under the influence of an exterior magnetic field which comprises a plurality of rotatable, multi-colored, non-magnetically interactive, permanently magnetized micromagnets disposed in a cavity within a body having a transparent surface and a plurality of relatively small compartments within the cavity. The device is illustrated by a sheet containing such micromagnets between the thin cavity of the front and rear surfaces of the sheet where the relatively even dispersion of the micromagnets in the sheet is maintained by such compartments whose barriers minimize displacement so that physical pressure exerted on the sheet, such as by a twist or flex, does not substantially alter the even dispersion of the micromagnets.

In an embodiment, the visual display device is a sheet, preferably a substantially transparent or invisible polymer sheet, containing relatively small compartments therein which have cellular and/or structural barriers which prevent substantial displacement therefrom by holding in such compartments rotatable micromagnets which are surrounded with a suspension or carrier fluid which allows such rotation. In the preferred embodiment the suspension or carried fluid is thixotropic.

In another embodiment, the sheet is prepared by dispersing fluid-surrounded micromagnets in a film former, such as a polymer, which is capable of hardening into a solid sheet where the rotatable, fluid-surrounded micromagnets are included as cells.

In another embodiment, a sheet is prepared by sealing a plurality of relatively small areas of fluid-surrounded micromagnets into a series of cells or compartments by coating such areas once or sequentially with a film former which on hardening seals the areas as cells or compartments.

In another embodiment, relatively small compartments, created by barriers in a fixed or random pattern, are pre-constructed in a sheet, the fluid-surrounded micromagnets are positioned therein, and the sheet sealed.

10 Claims, 8 Drawing Figures

CLARENCE R. TATE
INVENTOR

BY Sidney B. Ring
ATTORNEY

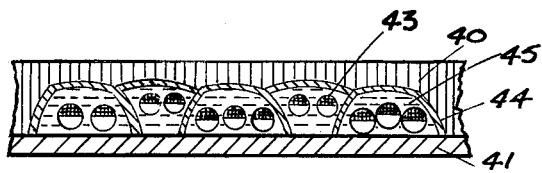
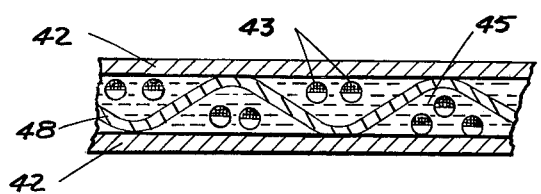
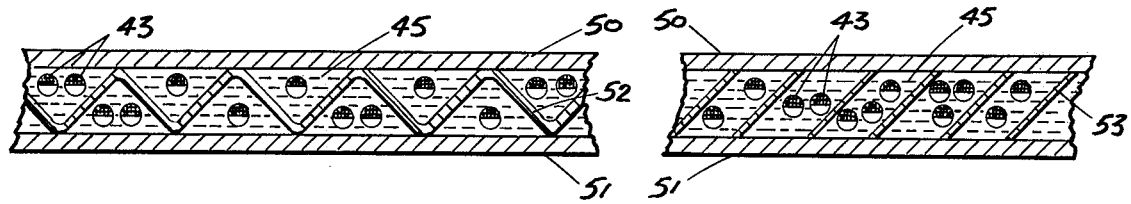
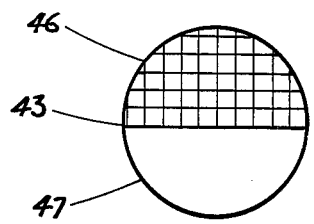

COMPARTMENTALIZED MICROMAGNET DISPLAY DEVICE

This application is a continuation-in-part of Ser. No. 756,711 filed Aug. 6, 1968, now abandoned which in turn is a continuation-in-part of Ser. No. 553,086 filed May 26, 1966, now abandoned.

This invention relates to improved magnetically actuatable visual display devices and the methods for making same. More particularly it relates to a device containing, in tiny cells or compartments, rotatable multicolor micro-magnets which may be magnetically oriented to provide a visual display. The dividing partitions between the cells or compartments, preferably transparent and undiscernable to the unaided eye, provide important structural contributions against physical pressure on the device and in so doing prevent such pressure from translationally displacing the micromagnets.

In U.S. Pat. No. 3,036,388, since reissued as U.S. Pat. Nos. Re. 25,363 and Re. 25,822, I have described color coded micromagnets which may be turned by an activating magnetic force to present Zones of one color or another and which may be oriented selectively so that the colors presented by some contrast with the colors presented by the others, producing thereby a visuably distinct pattern. The micromagnets are made to possess a low volumetric magnetization so that their magnetic strength is insufficient to cause a magnetic interaction which would prevent selective orientation by an activation external magnetic force. Thus, the permanently magnetized micromagnets are non-magnetically interactive, i.e., they have a unit volumetric magnetization below the point at which the closely associated micromagnets tend to be attracted to each other in the system in which they are employed which will cause them to resist individual orientation by the external magnetic force of the writing instrument. They can be mixed with a liquid suspending medium and dispersed in the thin cavity formed between two spaced surfaces, at least one of which is transparent. An inner face can be provided with dimpled indentions which, while allowing axial rotation of the micromagnets, restrain their translational movement.

The micromagnets so suspended function quite satisfactorily, unless the shape of the thin cavity is changed by a physical distortion, such as a twist or a flex, which may displace some of the micromagnets, leaving portions of the sheet vacant and inoperable.

As will be apparent from the description herein, the problem of translational movement is prevented by the successful containment of the micromagnets in cells or compartments, the walls of which are invisible or minimumly visible to the unaided eye. In one example, a continuous hardened transparent film, such as a synthetic polymer such as polyvinyl acetate or copolymers thereof, etc., or a natural organic polymer such as gelatin, etc. contains discrete fluid containing inclusions, there being mobile multicolored micromagnets entrapped within the the inclusions and being selectively orientable by application of magnetic fields to the sheet, each of the said micromagnets being permanently magnetized to a constant magnetization vector; and the micromagnets having distinct zones of contrasting colors which are visible through such film.

In another embodiment, a substrate carries the micromagnets in a suspension liquid, the mixture having been first deposited in broken patterns on a substrate and then sealed into cells by a hardenable coating, the vacant areas between the cells then having been filled with similar deposits, with these then having been so sealed.

And a third embodiment comprises a pre-constructed transparent carrier with partitions so arranged that micro-magnets can be drawn into pre-constructed and pre-arranged inclusions.

In addition to the patent before mentioned, micromagnets of two or more colors and of various shapes are disclosed in my U.S. Pat. Nos. 3,460,248 and 3,406,363 and any such micromagnets may be used in the instant invention. For the purpose of illustration, herein, the micromagnets are shown with only two colors, though they may have more. For illustration, the micromagnets used in the continuous film are shown as platlet shaped and the micromagnets which were prearranged on a carrier, and the micromagnets which were injected into a preconstructed compartmentalized carrier are shown, for illustration, as spherical or spheroidal.

The size of the micromagnets can vary widely. For example, the micromagnets useful in the practice of the invention are in a size range such that they have a broad dimension between less than about 25 and 1,000 microns or greater. Micromagnets of about 45 microns provide a smooth uniform appearance at the viewing surface since the individual micromagnets cannot be resolved by the eye. Micromagnets in the range of about 25 to 250 microns in size are preferred, but micromagnets up to about 1,000 microns are generally useful.

The micromagnets are carried in a suspending liquid in which they are free to rotate upon the application of a magnetic field. It is desirable to provide this liquid with a viscosity and thixotropy such that a certain minimum force must be applied in order to rotate the micromagnets. Such viscosity and thixotropy provide a degree of stability to the display device, minimizing unwanted disorientation of the micromagnets.

Other objects and advantages will be apparent from the accompanying detailed description and drawings wherein:

FIGS. 4 and 5 are diagrammatic cutaway cross-sectional views of sheets where the micromagnets and suspension liquids are deposited and sealed in cells in broken or random patterns;

FIGS. 6 and 7 are diagrammatic cutaway cross-sectional views of sheets where the micromagnets and suspension liquids are deposited in pre-constructed and pre-arranged compartments; and FIG. 8 is a magnified side view of a spherical micromagnet.

Figure 1:
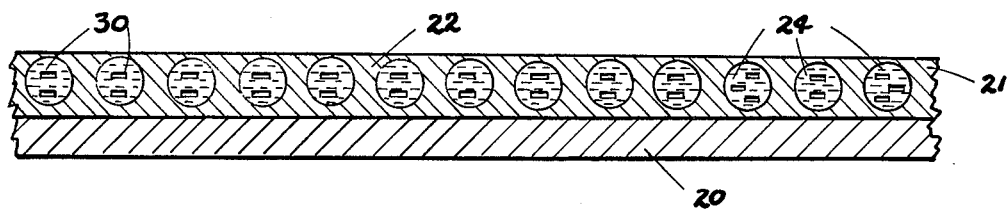
FIG. 1 is a diagrammatic magnified cutaway cross-section view of a substrate coated with a micromagnet-containing coating of the present invention.
Figure 2:
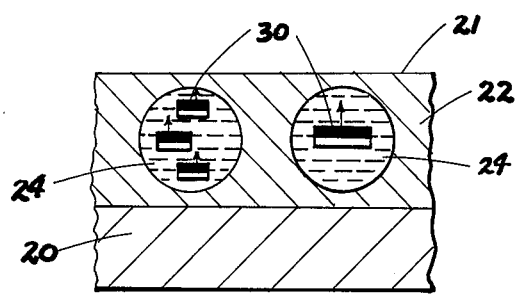
FIG. 2 is a greatly magnified cutaway cross-section view of a portion of the coated substrate of FIG. 1.
Figure 3:
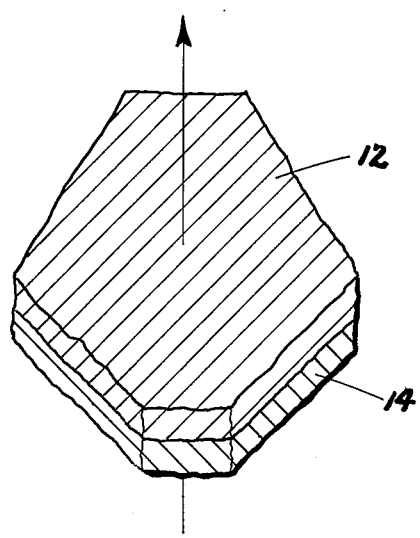
FIG. 3 is a greatly magnified perspective view of a platlet shaped two-colored magnetically orientable micromagnet.

When used in a display device, the micromagnet of FIG. 3 which can be employed in FIGS. 1 and 2 as 30 will present first colored surface 12 when the south pole of a magnet is passed over the display device, and second colored surface 14 when a north pole of a magnet is passed in front of the display device. Electromagnets, magnetic tapes, and other sources of magnetic fields can be used to actuate the display devices of this invention in addition to styli.

FIGS. 1 and 2 show a cross-sectional side view of a substrate 20 with a magnetically actuatable coating 21 of the present invention thereon which coating is made up of a continuous phase 22 containing as a discontinuous phase tiny liquid-containing inclusions 24. The inclusions 24, on the average, contain one or more colored micromagnets 30 suspended within the liquid 24 which are free to rotate therein when actuated by magnetic forces. Substrate 20 may be cloth, plastic, paperboard, metal, etc. or other suitable backing. In a further embodiment, the coating 21 may be used as a free film without backing.

The magnetic orientation of the several micromagnets is illustrated by the arrow in each of the FIGURES, the arrowhead in each instance, for convenience, indicating the north pole.

The micromagnets shown in FIGS. 1, 2 and 3 are from sheets having two distinctly colored layers, as will be described in the following examples. But as has been explained in the earlier patents mentioned, micromagnets possessing more than two distinct color zones, produced from sheets having more than two separately colored layers, can be oriented to intermediate degrees of rotation to produce combinations and blends of colors.

Coating 21 is formed by suspending micromagnets 30 in a suitable liquid 24 which is preferably an oily liquid having a density and viscosity such that the micromagnets will remain suspended therein without a great tendency to either sink or float. After thoroughly mixing the micromagnets in the liquid, this liquid with the micromagnets suspended therein may be mixed with a film-forming material in which it is immiscible so that continued mixing will form an emulsion or dispersion of micromagnet-containing droplets within the film-former. This emulsion may then be coated over the substrate 20 and hardened to provide a coating in which the micromagnet-containing inclusions form a discontinuous phase within a continuous hardened film-former 22. Each inclusion ideally should contain one or a small number of micromagnets. Film-former 22 may be a gelatinuous or waxy material or preferably an oil immiscible, hardenable plastic resin such as vinyl acetate, polyvinylpyrrolidone, ureaformaldehyde, polyvinylbutyral, polyvinylalcohol or methylcellulose.

The coating shown in the drawings contains a single layer of micromagnet-containing fluid inclusions in coating 21. A uniform single layer of this type is preferred for purposes of economy. It will be understood, however, that coating can be formed in which inclusions are several layers deep. Such multiple layers may be preferred where very complete coverage of the substrate is desired.

The following examples in which all proportions are given in parts by weight unless otherwise indicated, will serve to illustrate but not limit the invention.

EXAMPLE 1

A hardenable white composition was prepared by mixing the following ingredients:

|  | Parts |
| --- | --- |
| Styrene-butadiene copolymer containing 65% by weight TiO$_2$ pigment (Goodyear Pliolite 1A-S5) | 16.6 |
| Toluol solvent | 25 |

This composition was roll coated with a rotogravure 120 Tri-helicoid roll at a rate of 15 yards per minute onto a plastic release web. This coating was oven dried at 250°F. The coating had a dry weight of 0.00073 gm/cm$^2$ of area. A black colored hardenable coating composition was prepared by mixing the following ingredients:

|  | Parts |
| --- | --- |
| Styrene-butadiene copolymer containing 40% carbon black (Goodyear Pliolite 2C-S5) | 4.5 |
| Barium ferrite containing polymer (.224 parts barium ferrite, 0.071 parts clear styrene-butadiene copolymer Pliolite S5-E, 0.295 parts toluol) | 0.59 |
| Toluol | 14.5 |

This composition was coated using an 80 Tri-helicoid rotogravure roll over the white layer and oven dried at 250°F. The black layer had a dry weight of 0.00065 gm/cm$^2$. The combined layers had a weight of 0.00138 gm/cm$^2$ and a calculated density of 1.77 gm/cm$^3$. The combined layers had a barium ferrite content of 2.2%. The hardened material was passed on the carrier web between the poles of an electromagnet, magnetized at 9,000 gauss at a speed of 1 foot per second. Material was removed from the carrier web by flexing and air blasting, and then was conveyed at high velocity through a tortuous path where it impinged against itself and other obstructions until the average particle diameter was about 1 ½ times its thickness. Outsized particles were removed by screening.

A suspension in oil of the black and white micromagnets was formed by mixing the particles into the following oily mixture:

|  | Parts |
| --- | --- |
| Low molecular weight chlorotrifluoroethylene polymer having a density of 1.9 and a Brookfield viscosity of 72°F., No. 1 spindle 30 rpm, 124 centipoise (Kel F Oil No. 3, 3M Co.) | 300.00 |
| Oil having a density of 0.85 and a Brookfield viscosity of 24 (No. 1 spindle, 60 rpm, 72°F.) (Retrax, Std. Oil Co.) | 269.00 |
| Purified bentonite with an organic base, gelling agent (Bentone 38, Nat. Lead Co.) | 1.00 |
| Stearic Acid | 4.75 |

The oil mixture had an approximate density of 1.21 and approximate viscosity of 70 centipose when measured on the Brookfield Viscosimeter using a No. 1 spindle at 30 rpm.

A resin mixture was formulated by mixing the following ingredients:

|  | Parts |
| --- | --- |
| Copolymer of vinyl acetate and a carboxylated monomer (Gelva C5V10, Shawinigan Corp.) | 86.0 |
| Saturated polyester resin plasticizer (Harflex 340, Harchem Div., Wallace & Tiernan Inc.) | 8.6 |
| Methanol | 180.0 |

The resin mixture had a calculated density of approximately 0.91 and a Brookfield viscosity of 140 centipose. An oil resin emulsion was formed by mixing 1 part by volume of the magnet contained oil mixture with 3.5 parts by volume of the resin. After mixing, an emulsion was formed in which the resin was a continuous phase having dispersed therein oil droplets averaging about 10 mils in diameter as a discontinuous phase. One or more colored micromagnets were contained within the preponderant number of oil droplets. The emulsion was knife coated using a 0.025 setting of 2 mil hard aluminum foil previously coated with a 2 mil thick black pigmented vinyl acetate based coating. The coating was dried by passing high velocity room temperature air thereover until a surface skin was formed and then air dried overnight. By pouring the coating on a temporary carrier such as stainless steel or polytetrafluoroethylene, from which it is separable, a free film having magnetic inclusions can be produced instead.

EXAMPLE 2

Color coded micromagnets were prepared with a binder of lacquer containing appropriate color pigments. The lacquer was a widely marketed type containing cellulose nitrate, ester gum, plasticizer, glycol esters, alcohols, aromatic and aliphatic hydrocarbons and was slightly thinned with lacquer thinner. By weight, a white portion contained 60 parts of lacquer, and 50 parts of $TiO_2$ pigment. A red portion contained 25 parts of red pigment, 10 parts barium ferrite, and 75 parts of lacquer. A small amount of corn starch was added to thicken the blends to a more easily spreadable viscosity.

The blends were coated in successive layers on a polyethylene carrier with intermediate drying, a ½ mil thick white layer being applied first followed by a ¼ mil red layer. In spreading, the depth of each layer was controlled by drawing the sheet between spaced bars.

Several sheets of the coated carrier was stacked, each with the same color up, between the poles of a large electromagnet where they were subjected to a strong magnetic field which magnetized the barium ferrite component. The sheets were then peeled from the carrier and broken up into micromagnets capable of passing through a 325-mesh screen.

An oily suspending liquid was prepared having in parts by volume:

2 parts of light petroleum oil
    ¼ part poppy seed oil
    ¼ part paraffin oil
    ⅙ part fluorocarbon oil (Kel F Oil No. 1)

Into this blend was thoroughly mixed finely divided magnesium aluminum silicate (Bentone), to increase the thixotropy and viscosity of the oil. Generally, it will be found desirable to increase the viscosity and thixotropy if the micromagnets to be used have a comparatively strong magnetization, but to leave the liquid thinner and less viscous if the micromagnets are of a weaker magnetization.

Into this first suspending liquid was then thoroughly dispersed one-sixth part micromagnets.

A second film former liquid was then prepared having in parts by volume:

1 part water
    ¾ parts methanol (99.9% by volume)
    ¾ parts ethanol (190 proof)
    ¼ part glycerine
    ½ part gelatin This mixture was heated to boil under constant stirring and poured into a measured container. The liquid was allowed to cool about 120°F. and an amount of the first liquid equal to one-half of the volume of the second was poured into the second liquid where, by reason of its heavier specific gravity, it sank to the bottom of the container. Under gentle agitation the first liquid separated into tiny droplets, which emulsified in the gelatin liquid. Under continued agitation the droplets were progressively reduced in diameter. Agitation was discontinued when the size of the oil droplets was slightly larger than the size of the micromagnets. The emulsion was then poured onto a plastic substrate to form a uniform coating. The substrate was opaque and black in color. The gelatin liquid hardened with the micromagnet-containing oil inclusions distributed therethrough.

To increase the durability of the display device a protective coating of transparent plastic such as clear liquid polyester resin which hardens to provide a durable surface can be applied over the gelatin coating. Alternatively, a transparent plastic may be laminated over the gelatin coating with a transparent adhesive.

The emulsion may be spread onto a transparent carrier such as a sheet of Mylar, which carrier can then be used as the viewing and marking surface. A dark backing can be provided by adhering such as black cloth to the film before the film has hardened.

A non-oily suspension carrier liquid may also be used. A low viscosity epoxy resin liquid (Celanese Epi-Rez 5077) having a specific gravity of 1.13 – 1.15 and a viscosity of 500 – 500 cps. at 77° was mixed by volume 2½ parts to ¾ parts with tetrachloromethane, having a specific gravity of 1.595, and into this mixture was thoroughly dispersed ½ part colloidal silica powder thixotropic thickener (Cab-O-Sil). No curing agent was used with the resin, of course, since its function here was to remain in a liquid state. The micromagnets were then suspended in this and the liquid was emulsified in the gelatin film-former.

In the emulsification of microscopic droplets containing multi-colored micromagnets the problems faced are greater than those in the encapsulation of unmagnetized particles of powder. For instance, if micromagnets of a given magnetic strength are suspended in droplets of a carrier liquid having, inappropriately, a viscosity too weak and insufficient to provide the restraint of them needed, they will, in attempting to join together magnetically, quickly work out of their suspension droplets to become embedded in the yet ungelled cellular walls. In the foregoing examples the viscosity and thixotropy was adjusted to prevent magnetic joining together of the micromagnets to a degree which would interfere with their enclosure in separate capsules. Bentonite, a thixotrophy producing suspending agent, was chosen as a suitable thickener, although other thixotrophy producing agents such as the colloidal silica powder (Cab-O-Sil) are also useful for this purpose. Optimum results are achieved with a thixotropic suspending or carrier fluid.

If the suspension liquid is viscous and/or thixotropic enough to resemble a gel, little or no emphasis need be given to its density; but if it is fluid enough to readily flow then the degree of its viscosity and/or thixotropy, while adjusted to minimize unwanted magnetic interaction between the micromagnets, will alsos contribute toward holding the micromagnets in buoyant suspension and the degree of its viscosity and/or thixotropy will determine to some extent the density needed to hold micromagnets of a given weight in suspension within their droplets at least a period of minutes (at least long enough to permit the formation of a film from the film-former liquid), and preferably indefinitely. If, in an easily flowing carrier liquid of a given viscosity and/or thixotropy the density is inappropriately too heavy, the micromagnets will rise up out of their droplets or, if the density is too light, they will sink down out of their droplets, in either case with the hopeless projection of the micromagnets out of their suspension droplets to become embedded in the yet unhardened cellular walls. The exemplary suspension liquids were therefore adjusted to have the appropriate density by the use of Kel-F Oil, a fluorocarbon oil having a density of 1.9, which was mixed in suitable proportions with lighter oil to provide the workable density. Other suitable suspending liquids and blends of liquids prepared to have a chosen density will be apparent to those skilled in the art.

In summary, any suitable suspension or carrier fluid for the micromagnets can be employed. The carrier fluid should be capable of surrounding the micromagnets so as to allow them to rotate when they are acted on by an exteriorily applied magnetic field. Its chemical composition is immaterial provided the carrier fluid does not adversely affect the micromagnets or the polymer system. The carrier fluid should be substantially insoluble in the system.

For optimum performance, the carrier fluid should have certain densities, viscosities and thixotropies. Preferably, the density should be aproximately the same as that of the micromagnets so that they are supported substantially at equilibrium without rising or sinking. The viscosities and/or thixotropies should be such that the interaction of the micromagnets to each other and to an external magnetic field are properly controlled. Thus, It is desirable to provide a carrier fluid with viscosities and/or thixotropies so that a certain minimum force must be applied in order to rotate the magnet. Viscosities and/or thixotropies also provides a degree of stability to the display device by minimizing unwanted disorientations of the micromagnets. Densities, viscosities, thixotropies are imparted by the liquid itself, or mixtures of liquids, as well as by the introduction of density, viscosity and/or thixotropy agents.

There is an interrelation between density, viscosity and thixotropy in selecting the proper suspension or carrier fluid. The system is generally organic, preferably a hydrocarbon and/or a fatty oil. Glycerol, glycol, silicones and other fluids, as well as mixtures can also be employed. Fluorocarbons, because of the high densities, are a convenient method of increasing the density of the fluid suspension system. Viscosity and/or thixotropies are imparted to the system by means of gelling or thickening agents. Variation in the composition to achieve the desired function will be evident to one skilled in the art. Where viscosities and/or thixotropies are properly selected densities and are of lesser importance. Thixotropic liquids, emulsions, gels, etc. can be used.

Thixotropic agents have the property, when dispersed in suitable media, of exhibiting a variable viscosity which depends on the shear stress applied to the dispersion. At low shear stresses or at rest such thixotropic dispersions have high viscosities in the nature of elastic solids while at high shear stresses they have low viscosities. Thixotropic liquids are non-Newtonian whereas non-thixotropic liquids are Newtonian liquids, i.e., thixotropic liquids behave like elastic solids at low shear or at rest and behave like liquids at high shear. Thus, they are fundamentally different from viscous non-thixotropic liquids which behave like liquids both at rest and under low and high shear. This phenonomen of thixotrophy is believed to be due to the formation of a gel-like structure at low shear stresses with progressive disruption as shear stresses increase. Typical thixotropic agents are colloidal silica such as Cab-O-Sil, etc., bentonite or kaolinite clays such as Bentone, etc., carboxyl vinyl polymers such as those marketed by the B. F. Goodrich Chemical Company of Cleveland, Ohio, under the tradenames "Carbopol" and "Carboset," organometallic complexes such as those marketed by the Lubrizol Corporation of Cleveland, Ohio, under the tradename "Ircogel," Colloidal cellulose such as those marketed under the Trademark "Avicel;" colloidal asbestos such as those marketed under the Trademark "Avibest," by American Viscose Company, etc.

I have discovered that by controlling the thixotropy of the carrier fluid density and viscosity are of lesser importance since the self adjustments of the thixotropic system imparts proper variable viscosities under stress and static conditions. Therefore, a thixotropic carrier fluid is preferably employed in this invention to yield optimum results. By employing thixotropic liquids (i.e., which behave like solids at rest or low shear) the permanently magnetized micromagnets are prevented from magnetically interacting and clumping. Non-magnetized particles present no such problem since they do not interact magnetically.

Stated another way, the thixotropic fluid encases the micromagnetics as firmly and securely as a solid. Yet under a magnetic field where rotation is desired the area around the micromagnets forms islands of liquids which allow rotation. Such properties are not imparted to the system by density or viscosity alone.

The relationship between the density of the carrier liquid droplets containing the micromagnets with the viscosity and the density of the film-forming composition is also important. It is desirable that the carrier liquid droplets be held within the film-forming composition is buoyant suspension until the film hardens and in the foregoing examples the density of the suspension liquid, carrying the micromagnets, was chosen to be slightly greater than the density of the film-forming composition. Unless the film-forming composition is quite viscous, the micromagnetic-containing liquid droplets, if lighter than the film-forming composition, will rise and break out through the surface before the film has set.

After the emulsion or dispersion has been mixed and spread, the quickest possible hardening time is preferred. The micromagnets and the suspension droplets in which they are dispersed, having been agitated by the mixing and the spreading, continue within the still wet emulsion to have a considerable amount of motion and activity and while so doing the droplets tend to meet and merge and the micromagnets tend to project their surfaces out of the droplets to become adhered to the yet ungelled cellular walls.

In the first example of encapsulation the newly spread film was immediately subjected to high velocity air which speedily dried and set the surface skin and started the hardening of the cellular walls. In the second example, rapidly evaporating alcohols in major proportion were present in the film-forming composition, and when the heated gelatin emulsion was poured into a thin coating to cool, it started to gel in a matter of seconds.

In the successful encapsulation of the micromagnets, mobile suspension within microscopic inclusions, the relationship between the viscosity and thixotropy of the suspension liquid and the magnetic strength of the micromagnets is carefully chosen; the relationship between the density and viscosity of the suspension liquid with the specific gravity of the micromagnets is also carefully chosen, the relationship between the density and viscosity of the suspension liquid with the density and viscosity of the film-forming polymer is also carefully chosen, and the materials are selected to provide the quickest gel time after the emulsion has been coated onto its carrier.

Inclusions 24 are shown in the drawings to be spherical for purposes of illustration, but in practice often assume a flattened shape on drying of the coating. These flattened shapes can be made to overlie one another slightly to provide more complete coverage of the substrate.

FIGS. 4 and 5 show spherical or spheroidal multi-colored micromagnets 43 in a liquid 45, sealed within prearranged geometric patterns on substrate 41 or substrate 42, by film-forming coatings 44 or 48.

FIG. 8 shows a greatly magnified side view of a spherical shaped micromagnet, 43. For illustration color 46 is identified as blue and color 47 as white, though other contrasting colors may be used. Spherical or spheroidal multi-colored micromagnets were made of epoxy resin having a viscosity of 3,000 cps (Marblette Resin No. 658 with hardener No. 558, the Marblette Corporation). Mixed with 85 grams resin and 42½ grams hardener, by weight, was 20 grams finely divided barium ferrite (EG-1 Powder, Stackpole Carbon Company), 40 grams blue powder tempera, and 5 grams titanium dioxide pigment. In a closed circular container the composition, not yet hardened and still a liquid, was emulsified, by brief, vigorous agitation, in 800 grams of mineral oil, SAE No. 40, which had been heated to 175°F., the oil in the emulsion being the continuous phase and the microscopic liquid epoxy spheres being the discontinuous phase. The container was mounted on a carrier support which was motorized to move it first with a brief vigorous agitation, and then in an even circular pattern, this movement producing a steady centrifugal force which kept the hot emulsion constantly moving up and around the wall, thereby preventing the resin droplets from settling. The circle pattern had a diameter of about 4 inches and the speed was about 125 rpm. The container had a capacity of about 2 liters and was bowl shaped in design, having a base diameter of 3½ inches, a height of 5 inches, and a lid diameter of 8 inches. A small air vent valve, to relieve the pressure of the rapid air expansion caused by the sudden agitation of the hot oil inside the vessel, was provided in the lid which, otherwise, formed a tight seal on the vessel. Other containers may be used but the shape of the container contributes to the success of the method. The hot resin droplets, while still liquid, must be prevented from touching one another in the suspension or they will adhere to each other and agglomorate and harden into a useless mass and, in the examples given herein the hot emulsion, under controlled centrifugal force, moves easily from the small circumference to the large circumference, spreading its volume within the container and separating farther the resin droplets until they are cured into hard, independent spheres.

After about 20 minutes of the described motion, the spheres hardened and then were allowed to settle and the oil drained off. Oil residue was removed by cleaning with naphtha and the spheres were sized by screening. Coloring was done by sprinkling the spheres in a single layer onto a paper carrier which had been coated with cellulose nitrate lacquer greatly thinned and the spheres, adhering to the lacquer coating on the paper carrier, were immersed about halfway into white vinyl ink which had been heavily pigmented with titanium dioxide pigment. The carrier was then passed between the poles on a magnet charger, directionally magnetizing the barium ferrite so that the white portion of the sphere identified one pole and the blue portion identified the other and when dry, the two colored spheres were brushed off, ready for use.

In another instance, transparent spheres, each containing within themselves a platlet shaped color coded micromagnet, were made, thereby eliminating the painting requirement. Platlet shaped micromagnets of about 6 mils in size, were mixed, by volume about 10 parts with 100 parts low visocity polyester resin (Laminac Resin No. 4110, American Cyanamid Co. with methyl ethyl ketone peroxide as the catalyst), and an oil-resin emulsion was formed by mixing the polyester with 800 grams mineral oil SAE No. 20 which had been heated to about 200° F., the oil being the continuous phase and the polyester spherical droplets, averaging about 10 mils, being the discontinuous phase, and most of the polyester droplets having captured and enveloped within themselves a platlet shaped color coded micromagnet. As before described, the oily emulsion was then kept in a circular motion until the polyester spheres had hardened. Those carrying within them a micromagnet were than separated from those that did not, by centrifuging, or by flotation in a mixture of fluorocarbon oil and mineral oil, the proportionate ratios being carefully adjusted to provide a liquid with specific gravity in which the usable spheres, heavier because they carried within themselves a micromagnet, descended and separated from the lighter, all polyester, spheres which rose to the top.

In other instances, polyester was the hardenable material used for the pigmented micromagnets and clear epoxy was the material used for the transparent spheres containing platlet shaped multicolored micromagnets.

The amounts in the examples above given were based on the use of the circular container having about the capacity given, but does not limit the process which may be enlarged for commercial productions.

In FIG. 4, the suspension liquid 45 was prepared with purified bentonite (Bentone 38 Nat. Lead Co.) mixed under high speed shear dispersion in clear mineral oil to provide a thixotropic gel which could be arranged, such as by extruding or molding, in fixed patterns on a substrate. Spherical micromagnets 43, of about 5 mils in diameter, were then mixed into the gelled liquid and the mixture was extruded across a polyester substrate (Mylar) 41, in beads.

A rapid drying film-forming composition 44, prepared of, by weight, 10 parts cellulose nitrate (RS 125/175 sec., Hercules, Inc.) dissolved in 150 parts acetone, 5 parts isophorone, and 6 parts saturated polyester plasticizer (Harflex 335, Wallace & Tiernan, Inc.), was coated to cover so as to leave after the solvent had evaporated, a film having a thickness of about 1 mil — thus sealing the thixotropic gel within the pre-arranged pattern. Next, the vacant spaces between the beads were filled with the micromagnet-liquid mixture and the film-forming composition was coated to cover again. When this film was dry and hardened, the micromagnets within the sheet, were now positively contained between transparent structural partitions.

The cellular side may be given further protection and structural support. The cellular surface is usually somewhat uneven and a catalyst-hardening composition such as epoxy or polyester, coated over the cells, fills the uneven contours and hardens into a smooth outside surface. This optional coating is identified in FIG. 4 as 40.

The relationship of the resin, resin solvent, and plasticizer of the film-forming composition and the suspension or carrier fluid gel which it is to enclose are important. The resin solvent used was satisfactorily immiscible with the carrier liquid being enclosed. The ratio of solvent to resin provided a viscosity which could be conveniently spread. And, since the film is expected to dry and harden around the contour of a deposit of carrier liquid, certain critical limits exist. Improperly plasticized, the film may, as the solvent leaves, tighten and violently draw the carrier fluid gel deposit into an unusable distortion. And if the film does not sufficiently stretch, it may, in drying, rupture, forcing out some of the carrier fluid gel as it dries and tightens, Other suspension liquids for the micromagnets may also be used. Glycerol mixed with Cab-O-Sil to a usable carrier fluid gel was arranged on a cellulose acetate substrate in a broken pattern. The deposits of the glycerol micromagnets mixture were then covered with a film-forming composition consisting of 10 parts polyacrylic resin (n-Butyl methacrylate DuPont Elvacite No. 2044) and 2 parts polyacrylic resin (Isobutyl methacrylate DuPont Elvacite No. 2045) dissolved in 100 parts trichloroethylene. After the film had formed and dried, sealing into the pre-arranged cells the glycerol-micromagnet mixture, the vacant spaces were filled and the second coating was applied to cover.

A suspension liquid of, by volume, 50 parts glycerol and 50 parts ethylene glycol, into which was mixed Cab-O-Sil was also used. The ethylene glycol was used to reduce the viscosity of the suspension liquid and relatively greater amount of Cab-O-Sil thickener was then used to increase the thixotropy. It has been found that the micro-magnets respond more instantly in a liquid in which the suspension qualities have been provided with emphasis on a thixotropic structure rather than a heavy viscosity. Thus, thixotrophy, as distinguished from viscosity alone in the suspension liquid yields a more desirable and responsive device.

This suspension liquid, thickened to more or less a moldable carrier fluid gel and containing the micromagnets, was then arranged in a broken pattern on a Mylar substrate and coated with the above acrylic film former as described.

The broken pattern of the micromagnet-liquid mixture on the substrate may be arranged in several possible geometric patterns. Parallel beads and grooves have been described but checkerboard spacing of such shapes as squares, triangles, rectangles, and circles are also useful.

Also, a broken pattern can be arranged which requires only one coating of the film-forming composition. Beads of the micromagnet gel mixture, each bead extruded to have the cross sectional shape of a parallelogram, and the beads extruded quite close together so that they do not touch but slightly overlap, can then be covered with the film-forming composition which, while covering, fills the separating spaces between and then hardens.

FIG. 5 shows transparent carrier sheet, 48, formed to provide, on either side, depressions in which the micromagnet mixture may be deposited. Film-forming composition 42 was then applied to cover both sides, sealing, in permanent geographic locations within the structure, the micromagnet mixture. The fluted contours of transparent carrier 48 was by choice designed to provide a slight overlapping of the micromagnet mixture to give the effect of an unbroken appearance, but also satisfactory is a flat transparent sheet on which the micromagnet mixture is deposited in broken patterns on one side which slightly overlap the broken patterns on the other. Added and adhered to either side of the structure may then be protective sheets and backing.

A transparent film forms a useful dividing partition but since it may refract incident light, its presence may be slightly discernible. It has been found that a film disrupted in its continuity by such as minute indentations or holes, is optically superior. A one mil clear film, for example, thoroughly perforated with holes, preferably smaller that the micromagnets used, becomes virtually invisible within the structure. Also the same film, used as a substrate for broken pattern deposits, permits the suspension liquid to fill the holes within it and minimizes any visible lines of distinction between the deposits. Such a netlike substrate, carrying the micromagnet deposits can be sealed on the exposed side by a suitable adhesive sealant and/or enclosed within an envelope structured to have at least one transparent side.

Drying of the film-forming compositions on a sheet about 10 inches square was speeded by heating for 4 minutes, 12 inches under a 250 watt infra-red bulb. Coating was done by spraying or pouring.

The substrate carrying on it the micromagnet liquid mixture in cells provides a device which can be used to provide a visual display. If the substrate is transparent it may be used as the viewing surface. If it is opaque, the transparent cellular side would then be used for viewing.

FIGS. 6 and 7 show pre-constructed carriers for the micromagnet mixture. In FIG. 6 transparent corrugated divider 52 separates sheet 50 from sheet 51, at least one sheet of which is transparent, and forms with said sheets slightly overlapping triangular spahed compartments for the micromagnet mixture. Divider 52 was made of cellulose acetate .001 film corrugated between heated right and left threaded 1 in. rollers having UNS-10 threads. A solvent of, by volume, 4 parts acetone and 1 part isophorone was first lightly spread by roller onto sheets 50 and 51 which were .010 cellulose acetate, and they were then adhered to the corrugated divider as shown. Placed between two panes of glass and heated 4 minutes at 200° F., the union become permanent and warping of the structure was prevented.

Micromagnets averaging about 6 mils were then mixed with clear mineral oil that had been thickened with Cab-O-Sil and the mixture was drawn in to fill the triangular flutes by suction applied to one end. The ends were then sealed with cellulose acetate which had been dissolved, by weight, 1 part to 10 parts acetone.

FIG. 7 shows a carrier internally partitioned by individual transparent walls 53, inclined to provide a slight overlapping. Contained between the partitions are the micromagnets 43 in the suspension liquid 45 and other partitioning spacers will be apparent to those skilled in the art.

In the pre-constructed carriers, the suspension liquid may be such as oil, glycerine, or silicone fluid, or any liquid that does not chemically attack the material of the carrier or the micromagnets.

It is usually helpful, with any of the carrier devices disclosed herein, to use a backing having a dark color, which will absorb the incident light falling between the micromagnets. A light colored background, reflecting the incident light tends to interfere with and diminish the resolution of the visual display.

In selecting the substrate or backing, the purpose for which the device is intended is first considered. If the external activating magnetic force is to be applied from behind, as with a read-out indicator, the substrate would be chosen from a nonmagnetic material, such as plastic or paper.

In the case of a marking device, one in which the activating magnetic force is applied from the front, as with a magnetized writing stylus, a magnetizable back plate, such as a soft iron sheet, for example, will provide a conductor which will tend to concentrate the magnetic lines of force from the writing stylus, thus narrowing and strengthening its influence on the micromagnets and sharpening the resolution of the pattern they form. A carrier, such as paperboard, or a plastic sheet, coated on one surface with a suitable adhesive and then covered with iron filings, or other powdered magnetic material, will also provide a satisfactory magnetic backing.

In all of the foregoing examples micromagnets having identical color codings were used. It is possible, however, to mix various colors together and obtain a new color result. A sheet containing, for example, yellow and white micromagnets, mixed with others of blue and white, will register a display of green and white. The use of such combinations can be advantageous in minimizing the number of micromagnets which need be prepared to form a wide variety of different colored display devices.

Materials hardened by catalyst action may be used as well as film-forming materials hardened by the evaporation of solvents. Beads of micromagnet-oil mixture were patterned across a 1 mil polyester substrate and covered with crystal clear epoxy resin (Marblette Resin No. 658 with hardener No. 558, the Marblette Corporation). A smooth sheet of polyester material (Mylar) was then placed across the epoxy and after the epoxy had hardened, the polyester sheet was peeled off leaving a smooth outer surface. The procedure was then repeated on the reverse side of the substrate, except that the beads of micromagnet-oil mixture were alternated, geographically, with those on the other side, thereby making the board appear to carry the micromagnets throughout in even dispersion. Since the epoxy would not adhere permanently to a polyester sheet, the substrate was first thoroughly perforated with minute holes and then coated thinly coated with the epoxy. Here, the perforations permitted the epoxy coating on both sides to join thru the substrate to form a permanent bond. The carrier liquid for the micromagnets consisted of mineral oil thickened with Bentone.

A wide variety of materials useful as film-formers can be employed in preparing the device depending upon the particular part of the device for which it is employed, the method of preparation, etc. For example, certain materials are preferred in preparing the exterior films of sheets, other materials are preferred for the interior compartments, while other materials are preferred in preparing the included cells, and still other materials are preferred for coating areas of fluid-surrounded micromagnets to build up sequential compartments. Examples of each have been presented herein. These materials are generally polymers, particularly film-forming polymers, both organic and inorganic, including both natural and synthetic polymers or mixtures of both natural and synthetic polymers.

The essence of the present invention relates to the use of compartments or cells to prevent displacement of the multi-colored micromagnets from their assigned position in the sheet without distracting from the desired function of the micromagnets such as rotability. By preventing displacement, the desired distribution of the micromagnets is maintained even under rigorous use. Materials and techniques for achieving this have been described herein.

As is quite evident other film formers and polymers, other suspending or carrier fluids permitting mobility including thixotropic agents, other micromagnets, etc. are known or will be constantly developed which could be useful in this invention. It is, therefore, not only impossible to attempt a comprehensive catalogue of such components, but to attempt to describe the invention in its broader aspects in terms of specific chemical names of all components that could be used would be too voluminous and unnecessary since one skilled in the art could by following the description of the invention herein select useful polymers, fluids and micromagnetics. This invention lies in the preparation of suitable multi-colored, magnetically activated display devices and their individual components are important only in the sense that they affect the preparation of a suitable device. To precisely define each possible component and each possible variation in preparative techniques in light of the present disclosure would merely call for knowledge within the skill of the art in a manner analogous to a mechanical engineer who prescribes in the construction of a machine the proper materials and the proper dimensions thereof. From the description in this specification and with the knowledge of one skilled in the art, one will know or deduce with confidence the applicability of specific components suitable in this invention. In analogy to the case of a machine, wherein the use of certain materials of construction or dimensions of parts would lead to no practical or useful result, various materials will be rejected as inapplicable while others would be operative. One can obviously assume that no one will wish to make a useless multi-colored magnetically operated display device nor will be misled because it is possible to misapply the teachings of the present disclosure to do so.

Thus, the examples given herein are intended to be illustrative and various modifications and changes in the materials and structures may be apparent to those skilled in the art without departing from the spirit of this invention. For example, the oil surrounding the micromagnets for the most part separates them from the epoxy composition sufficiently to prevent adhesive bonding but while the epoxy system is curing it may nevertheless touch and tend to adhere to some of the micromagnets and such unwanted bonding was minimized or prevented during the curing period by occasionally rotating the micromagnets by an externally applied activating magnetic field.

In another embodiment the micro-magnet oil mixture was positioned in a broken pattern on a .025 sheet of aluminum substrate and covered with a coating of catalyst hardenable polyester (Laminac resin No. 4110, American Cyanamid Company with methyl ethyl ketone peroxide as the catalyst) which was then allowed to harden.

The micromagnet-oil mixture was then patterned across to alternate geographically with the first deposits and a second coating of the polyester resin and then applied to cover and allowed to harden. Each coating, while curing, showed a tendency to "crawl" and it was found that this untoward movement could be virtually eliminated by spreading across the freshly poured coating a restraining web such as a thin diaphanous like sheet of tissue paper which, when saturated with the polyester resin, became transparent and virtually undetectable within the device. During the curing periods the micromagnets were occasionally magnetically rotated to discourage the formation of any adhesive bond between them and the polyester resin. After the second coating had hardened the board was useable for purposes of providing a visual display. A third coating, however, was then spread and across it was placed a smooth sheet of Mylar, this sheet being unrolled across the coating in a manner which pushed ahead and out any air bubbles. After hardening, the Mylar sheet was peeled off and the third coating then contributed a smooth surface as well as further structural strengthening to the device. As is well known the curing period of most catalyst hardening systems can be speeded by the application of heat.

The catalyst hardenable compositions as described provided a rigidly constructed durable device capable of withstanding considerable physical handling or abuse such as might be expected by a device adapted for use, for example, as a marking board for children.

Having thus described my invention, what I claim as new and desire to obtain by Letters Patent is:

1. A method of forming a sheet adapted to provide a visual display when acted on by exteriorly applied magnetic forces comprising
   a. providing micromagnets of a size range from about $25\mu$ to about $1000\mu$, said micromagnets having a constant magnetization vector and surface color zones of contrasting colors;
   b. suspending said micromagnets in a transparent carrier liquid of a density and viscosity sufficient to hold the said micromagnets in suspension at least a period of minutes;
   c. suspending droplets of said carrier liquid containing said micromagnets in a liquid organic film-former, the density of the film-former liquid being about equal to or slightly less than that of said carrier liquid so that said droplets do not rise out of the film-former liquid;
   d. forming the resulting suspension into a thin layer; and
   e. hardening said film-former into a transparent organic polymeric film containing said droplets as fluid inclusions.

2. A method according to claim 1 wherein said carrier liquid is thixotropic.

3. A method according to claim 2 wherein said carrier liquid contains a finely divided suspending agent.

4. A sheet adapted to provide a visual display when acted upon by exteriorily applied magnetic forces comprising: A continuous hardened organic polymeric film containing as a discontinuous phase discrete fluid-containing inclusions, said inclusions having mobile multicolored micromagnets entrapped therein, said micromagnets being rotatable within said inclusions and selectively orientable with respect to the faces of said film by a magnetic field, said micromagnets being visible through said film and having a constant magnetization vector and distinct surface color zones of contrasting colors, said sheet being backed by a substrate which substrate is comprised of magnetizable material.

5. A magnetically actuatable device adapted to provide a visual display comprising:
   a. a substrate having thereon in the form of a coating a continuous hardened composition containing as a discontinuous phase discrete fluid filled inclusions distributed therethrough,
   b. said inclusions having color coded micromagnets encapsulated therein,
   c. said micromagnets being viewable through and rotatable within said composition,
   d. said micromagnets having at least two separate and distinct color zones and a constant magnetization vector with respect to said color zones and being selectively orientable by an external activating magnetic force and being in the particle size range of about 25 to 1000 microns.

6. A device according to claim 5 wherein said fluid is a transparent oil.

7. A device according to claim 5 wherein said substrate has a dark color.

8. A device according to claim 5 wherein said substrate is comprised of magnetic material.

9. A device according to claim 5 wherein the density and viscosity of said fluid is sufficient to hold said micromagnets in suspension for at least a period of minutes.

10. A device according to claim 9 wherein said substrate is comprised of magnetic material.

* * * * *